Aug. 12, 1969  C. B. RICHEY ET AL  3,460,633
SCARIFIER TOOTH KEEPER
Filed March 11, 1966

INVENTORS.
CLARENCE B. RICHEY
RICHARD W. KRAMER
BY Tweedale & Gerhardt
ATTORNEYS.

3,460,633
SCARIFIER TOOTH KEEPER
Clarence B. Richey, Fresno, and Richard W. Kramer, Fowler, Calif., assignors to Massey-Ferguson Inc., Detroit, Mich.
Filed Mar. 11, 1966, Ser. No. 533,612
Int. Cl. A01b *15/02, 13/00*
U.S. Cl. 172—691                   1 Claim

ABSTRACT OF THE DISCLOSURE

A scarifier for mounting to a three-point tractor hitch includes a transverse box beam having a plurality of laterally spaced pairs of aligned openings in the top and bottom walls. A tooth having a shank portion sized to the opening is insertable through each pair of openings until a notch is aligned with the top wall, whereupon the notch is engageable therewith to prevent vertical tooth movement. An elongated keeper has a bent end insertable through one of the top openings and a plurality of projections insertable through the remaining openings in the top wall adjacent the teeth shanks to prevent fore and aft tooth movement. Means are provided to prevent movement of the bar and thus tooth movement.

---

This invention relates to a scarifier implement mounted on a tractor and more particularly to a keeper bar for scarifier teeth.

As scarifier teeth are worn away rapidly they must be changed frequently. They are therefore usually mounted in such a way that they are held firmly in place by keeper means which can be readily removed so as to release the teeth. Previous keepers of said type require elaborate structure and often cannot be disengaged from the teeth easily.

It is therefore an object of this invention to provide a scarifier tooth keeper which can be economically manufactured, has good positive holding qualities and can be disengaged from the teeth in a very simple manner.

The invention is a tooth keeper in form of a bar being inserted at one end of the carrier beam or tool bar and held down at the other end thereof by a removable pin. The shanks which are inserted in openings in the top and bottom walls in the carrier beam have reduced width portions for engagement with a wall portion at the opening in the top wall of the carrier beam and are held in place by projections of the keeper bar which are adapted to press the reduced width portions of the shanks into the wall portions of the top wall opening engaging them.

An embodiment of the invention will now be described by way of example with reference to the accompanying drawings in which.

Figure 1:
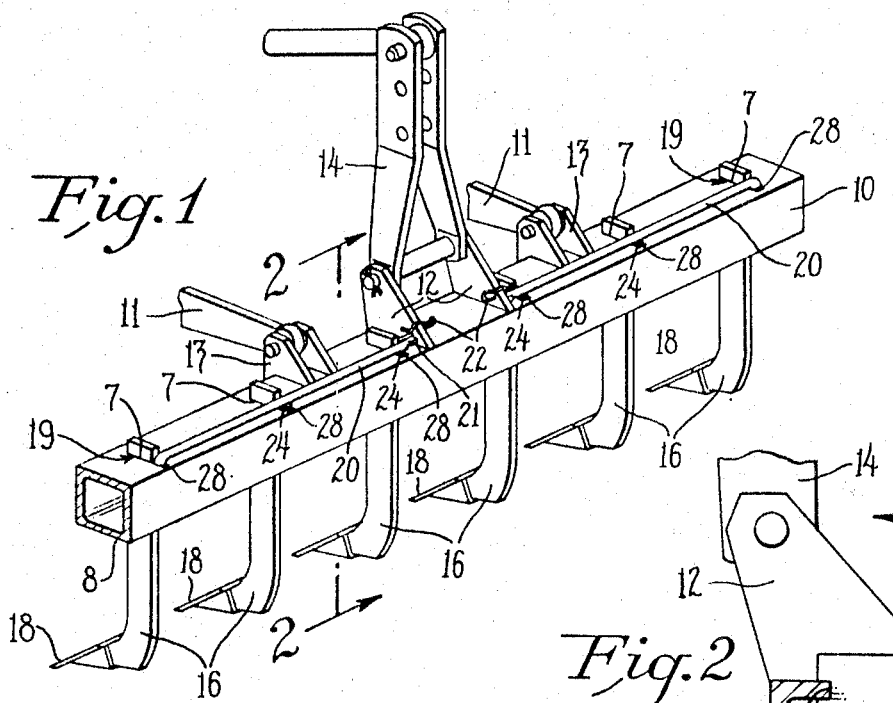
FIG. 1 is a perspective view illustrating an elongated carrier beam or tool bar with a plurality of scarifier teeth mounted therein and embodying the invention.
Figure 2:
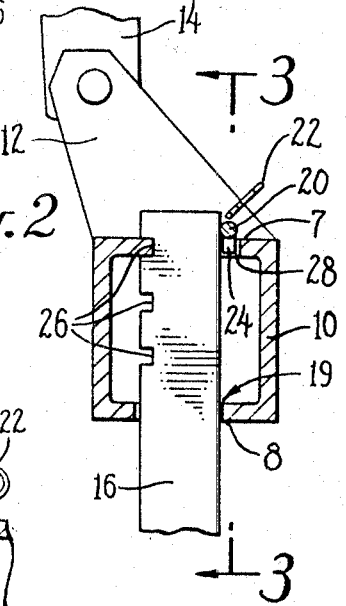
FIG. 2 is a partial sectional view taken on line 2—2 in FIG. 1.
Figure 3:
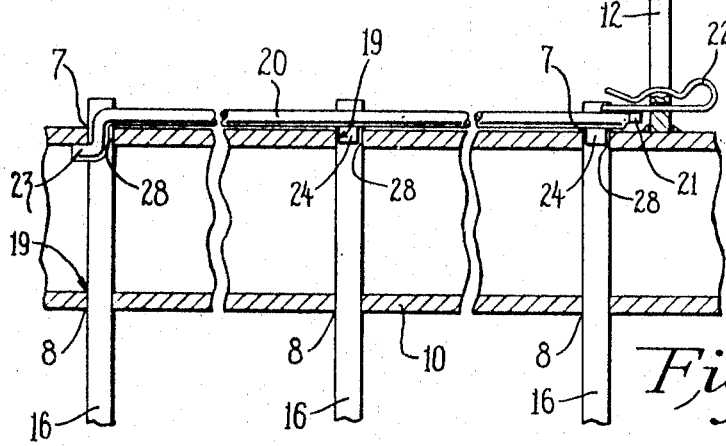
FIG. 3 is a partial sectional view taken on line 3—3 in FIG. 2.
Figure 4:
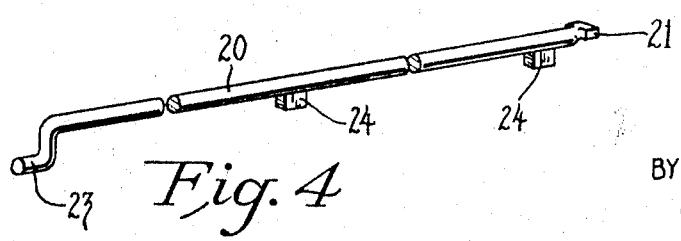
FIG. 4 is a detail view of the keeper bar.

In FIG. 1 there is shown a hollow carrier beam or tool bar 10 with a top and bottom wall having suitable attachment members 11 pivotally connected to brackets 13 on the beam 10, and a central carrier linkage 14 which is pivotally connected with bracket means 12 mounted on and projecting upwardly from the carrier beam 10. A plurality of shanks 16 extends through longitudinally spaced matching vertical openings 19 in the carrier beam 10. Each of the openings 19 has a top wall portion 7 and a bottom wall portion 8. Teeth 18 or other ground engaging tools are carried at the lower ends of the shanks 16.

Each shank 16 has preferably a plurality of reduced width portions 26 at its upper end, one of which can be engaged with the top wall portion 7 of the vertical openings 19 in the carrier beam 10. The lower portion 8 of each of the vertical openings 19 in the carrier beam 10 is just large enough to accommodate a shank 16 with some play. At the upper portion of each vertical opening 19 a space 28 remains in the side wall of the carrier beam 10 opposite the recessed side of the shank 16 upon engagement of a reduced width portion 26 with the top wall portion 7.

The spaces 28 have to be filled if the engagement between the edge of the top portion 7 of the opening 19 in the carrier beam 10 is to remain in firm engagement with one of the recesses 26 in each shank 16. This function is carried out by projections 24 on a tooth keeper bar 20.

The tooth keeper bar 20 whose projections 24 correspond with the width and the location of the spaces 28 in the upper portion of each beam opening 19 is inserted in the space 28 of the outermost vertical opening 19 in the carrier beam 10 with the offset end portion 23 of the tooth keeper 20 reaching under the top wall of the beam. Each projection 24 at the tooth keeper bar 20 extends into the space 28 at the top wall portion 7 of each opening 19 thus fixing the position of the shanks 16 in the carrier beam 10.

The inner end of the tooth keeper bar 20 is positioned near a carrier bracket 12 with its flattened end portion 21. A pin 22 is slidably arranged in the lower portion of the carrier bracket 12. It can be moved horizontally in both directions. If the pin 22 is pushed toward the outside of the carrier beam 10, its free end engages the upper side of the flattened end portion 21 of the tooth keeper bar 20 thus holding the keeper in its engaged position. Conversely, if the pin 22 is pushed in the opposite direction, the keeper bar 20 is freed by disengagement of the open end of the pin 22 from the flattened end portion 21 of the keeper bar 20. The tooth keeper means 20 can then be lifted out of the carrier beam 10 by removing its offset end 23 from the space 28 in the upper part of the outermost vertical opening 19 in the carrier beam 10.

Once the tooth keeper 20 has been completely removed, the tooth holders 16 can be taken out of the carrier beam 10 for replacement of the teeth 18 when they are worn away.

It will be seen that the improved tooth keeper bar 20 is adapted to hold a plurality of tooth holders in place and releases all of them at the same time simply by disengagement between the pin 22 and the flattened end portion 23 of the tooth keeper bar 20.

We claim:
1. An earthworking implement including an elongated carrier beam having a top wall and a bottom wall, bracket means mounted on said carrier beam, a plurality of openings in said top wall and bottom wall of said carrier beam, a plurality of ground engaging tools having shanks extending through said openings, said shanks having a width generally the same size as said openings and each shank having at least one reduced width portion at one side thereof for allowing fore and aft movement of said shanks in the openings in said top wall, keeper means for holding said shanks in a fixed operative position relative to said top wall, said keeper means comprising an elongated bar member having a plurality of projections received in said openings between said top wall and the side of said shanks opposite said reduced width portions for blocking fore and aft movement of said shanks out of said fixed operative position, and means for holding said keeper means in operative position comprising an offset end portion formed on said elongated bar member and engageable through one of said openings to contact the undersurface of said top wall, and a removable pin inserted through said bracket means and engaging the end of said elongated bar member opposite said offset end to block movement thereof and thereby prevent removal of said projections from said openings References Cited
UNITED STATES PATENTS

| | | | |
|---|---|---|---|
| 2,036,111 | 3/1936 | Wilson | 127—691 X |
| 2,578,131 | 12/1951 | Gannon. | |
| 2,992,499 | 7/1961 | McSpadden. | |

ANTONIO F. GUIDA, Primary Examiner

RONALD C. HARRINGTON, Assistant Examiner